United States Patent
Han et al.

(10) Patent No.: US 10,586,390 B2
(45) Date of Patent: Mar. 10, 2020

(54) VIRTUAL REALITY ELECTRONIC DEVICE FOR DISPLAYING COMBINED GRAPHIC OBJECT AND IMAGE FRAME AND CORRESPONDING COMPUTER-READABLE RECORDING MEDIUM

(71) Applicant: SAMSUNG ELECTRONICS CO., LTD., Suwon-si, Gyeonggi-do (KR)

(72) Inventors: Mansu Han, Yongin-si (KR); Joo Namkung, Gwangju-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/607,803

(22) Filed: May 30, 2017

(65) Prior Publication Data

US 2018/0033206 A1 Feb. 1, 2018

(30) Foreign Application Priority Data

Jul. 29, 2016 (KR) ........................ 10-2016-0096743

(51) Int. Cl.
*G06T 19/00* (2011.01)
*G06F 3/01* (2006.01)
*G06F 3/0346* (2013.01)
*G06F 3/0481* (2013.01)
*G02B 27/01* (2006.01)
(Continued)

(52) U.S. Cl.
CPC .......... *G06T 19/006* (2013.01); *G02B 27/017* (2013.01); *G06F 1/163* (2013.01); *G06F 1/1686* (2013.01); *G06F 3/011* (2013.01); *G06F 3/012* (2013.01); *G06F 3/0346* (2013.01); *G06F 3/04815* (2013.01); *G06K 9/481* (2013.01); *G06K 9/6202* (2013.01); *G06T 3/20* (2013.01); *G06T 7/248* (2017.01); *G06T 7/74* (2017.01); *G06T 11/00* (2013.01);
(Continued)

(58) Field of Classification Search
CPC .................................................. G06T 19/006
See application file for complete search history.

(56) References Cited

U.S. PATENT DOCUMENTS 6,625,299 B1 9/2003 Meisner et al.
7,162,054 B2 1/2007 Meisner et al.
(Continued)

OTHER PUBLICATIONS

Extended Search Report dated Oct. 24, 2017 in counterpart European Patent Application No. 17176341.0.

*Primary Examiner* — Jeffery A Brier
(74) *Attorney, Agent, or Firm* — Nixon & Vanderhye P.C.

(57) ABSTRACT

Disclosed is an electronic device for displaying a graphic object. The electronic device may include: a camera; a display; and a processor configured to control the display to display a first image frame acquired through the camera, to determine at least one graphic object to be displayed on the display based on a plurality of first feature points of the first image frame, to determine a location of the at least one graphic object to be displayed in a second image frame based on locations of a plurality of second feature points of the second image frame acquired through the camera and locations of the plurality of first feature points, to combine the at least one graphic object and the second image frame based on the determined locations and control the display to display the combined graphic object and second image frame.

20 Claims, 12 Drawing Sheets

(51) Int. Cl.
  *G06T 11/00*   (2006.01)
  *G06T 7/73*    (2017.01)
  *G06T 7/246*   (2017.01)
  *G06F 1/16*    (2006.01)
  *G06K 9/48*    (2006.01)
  *G06K 9/62*    (2006.01)
  *G06T 3/20*    (2006.01)

(52) U.S. Cl.
  CPC ............... *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 2010/0142826 A1* | 6/2010 | Kotake | G06T 7/75 382/203 |
| 2014/0016825 A1 | 1/2014 | Kasahar | |
| 2014/0071116 A1 | 3/2014 | Johansson et al. | |
| 2014/0267420 A1 | 9/2014 | Schowengerdt et al. | |
| 2015/0178992 A1* | 6/2015 | Bhuruth | G06T 19/006 345/633 |
| 2015/0187108 A1 | 7/2015 | Mullins | |
| 2015/0254870 A1 | 9/2015 | Knibbe et al. | |
| 2016/0035139 A1 | 2/2016 | Fuchs et al. | |
| 2016/0330522 A1* | 11/2016 | Newell | G06F 21/604 |
| 2017/0213388 A1* | 7/2017 | Margolis | H04N 19/139 |
| 2018/0040133 A1* | 2/2018 | Srinivasan | H04N 19/56 |

\* cited by examiner

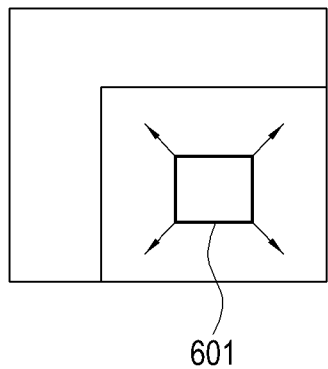
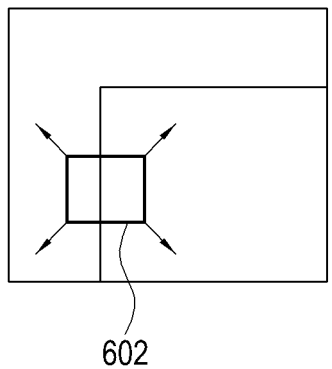
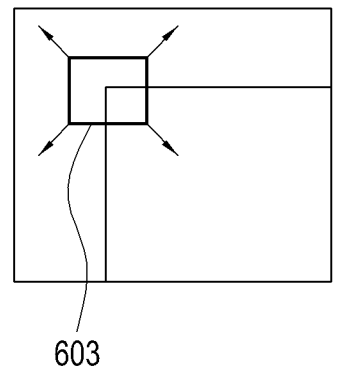
FIG.6A    FIG.6B    FIG.6C
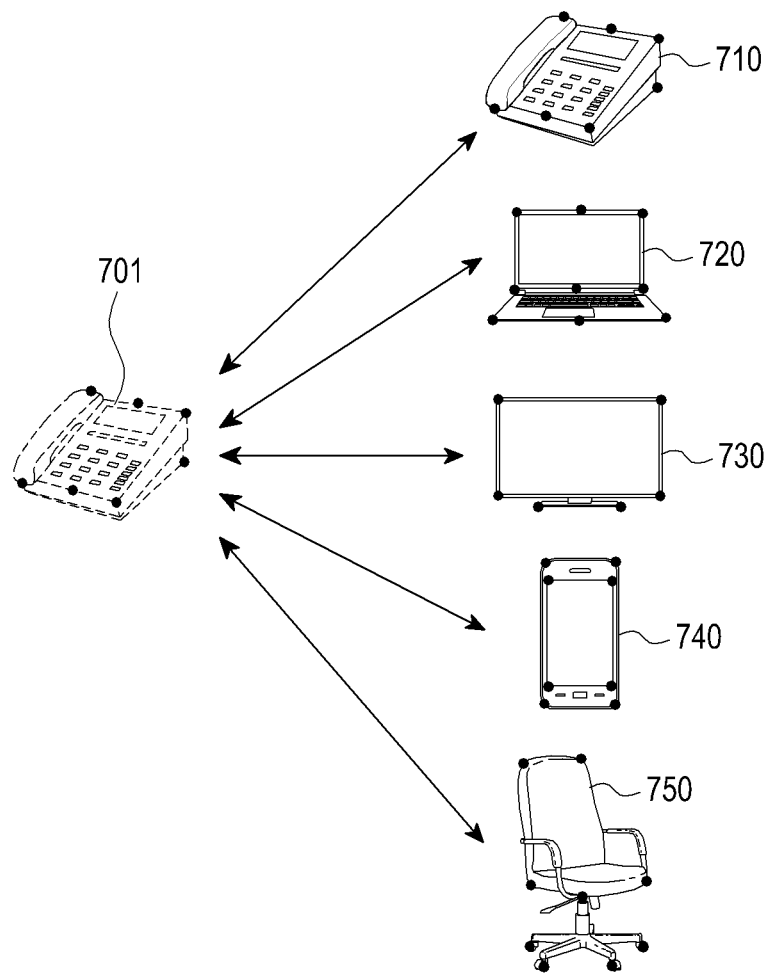
FIG.7

VIRTUAL REALITY ELECTRONIC DEVICE FOR DISPLAYING COMBINED GRAPHIC OBJECT AND IMAGE FRAME AND CORRESPONDING COMPUTER-READABLE RECORDING MEDIUM

CROSS-REFERENCE TO RELATED APPLICATION

This application is based on and claims priority under 35 U.S.C. § 119 to Korean Application Serial No. 10-2016-0096743, which was filed in the Korean Intellectual Property Office on Jul. 29, 2016, the content of which is incorporated by reference herein in its entirety.

TECHNICAL FIELD

The present disclosure relates generally to an electronic device for displaying a graphic object.

BACKGROUND

In general, Virtual Reality (VR) refers to an environment or a situation realized in computer graphics having an environment similar to the real world and corresponds to an interface that allow a user to feel the environment through his/her sensory organs and makes the user feels as if an actual interaction were being conducted. The user may interact with virtual reality in real time through control of a device and may have a sensory experience similar to one in the real world.

Further, an Augmented Reality (AR) is one field of the virtual reality and refers to a computer graphic scheme that combines a real environment and a virtual object or information and makes the object looked as an object existing in the original environment. AR corresponds to a technology that shows a virtual object overlaid on the real world viewed through the user's eyes, and is also called Mixed Reality (MR) because additional information and a virtual world are added to the real world, and only one image is shown.

Further, recently, it is easy to frequently access virtual-reality technology in various services in fields such as education, games, navigation, advertising, or blogs through an electronic device that supports a virtual-reality service.

Meanwhile, these days, a Head-Mounted Device (HMD), which can be coupled to a display device, has been developed to support the virtual-reality service.

An electronic device supporting a virtual-reality service performs a process of generating a virtual graphic object by analyzing an image frame acquired through sensing of an external environment through a camera, combining the generated graphic object and the image frame, and displaying the combined graphic object and image frame on a display.

However, there is a problem in that a calculation time for analyzing the image frame and generating the graphic object becomes longer. Accordingly, motion-to-photon latency becomes longer when an HMD provides a virtual-reality service, which causes a user to feel dizziness. In other words, since a time difference is generated between the time point at which the user moves his/her head while wearing the HMD and the time point at which the user visually recognizes an image to be output to a display at the corresponding time point, the user fells dizzy due to a mismatch between motion information and visual information.

SUMMARY

In accordance with an example aspect of the present disclosure, an electronic device for displaying a graphic object is provided. The electronic device includes: a camera; a display; and a processor configured to control the display to display a first image frame acquired through the camera, to determine at least one graphic object to be displayed on the display based on a plurality of first feature points of the first image frame, to determine a location of the at least one graphic object to be displayed in a second image frame based on locations of a plurality of second feature points of the second image frame acquired through the camera and locations of the plurality of first feature points, to combine the at least one graphic object and the second image frame based on the determined locations and control the display to display the combined graphic object and second image frame.

In accordance with another example aspect of the present disclosure, a non-transitory computer-readable recording medium having a program recorded therein to be executed on a computer is provided. The program includes executable instructions to cause, when being executed by a processor, the processor to perform operations. The operations include: displaying an acquired first image frame; determining at least one graphic object to be displayed, based on a plurality of first feature points of the first image frame; determining a location of the at least one graphic object to be displayed in a second image frame based on locations of a plurality of second feature points of the acquired second image frame and locations of the plurality of first feature points; combining the at least one graphic object and the second image frame based on the determined location; and displaying the combined he at least one graphic object and the second image frame.

In accordance with another example aspect of the present disclosure, an electronic device for displaying a graphic object is provided. The electronic device includes: a camera; a display; and a processor configured to control the display to display a first image frame acquired through the camera, to determine at least one graphic object to be displayed on the display based on first information of at least one object of the first image frame, to determine a location of the at least one graphic object to be displayed in a second image frame based on the first information and second information of at least one object of the second image frame acquired through the camera, to combine the at least one graphic object and the second image frame based on the determined location, and control the display to display the combined graphic object and second image frame.

According to various example embodiments of the present disclosure, an electronic device providing a virtual-reality service can reduce motion-to-photon latency and thus provide a more convenient viewing environment to users.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIGS. 6A, 6B and 6C are diagrams illustrating an example extraction of feature points from an image frame by an electronic device according to various example embodiments of the present disclosure;

FIG. 7 is a diagram illustrating an example method of recognizing an object by an electronic device according to various example embodiments of the present disclosure;

DETAILED DESCRIPTION

Figure 1:
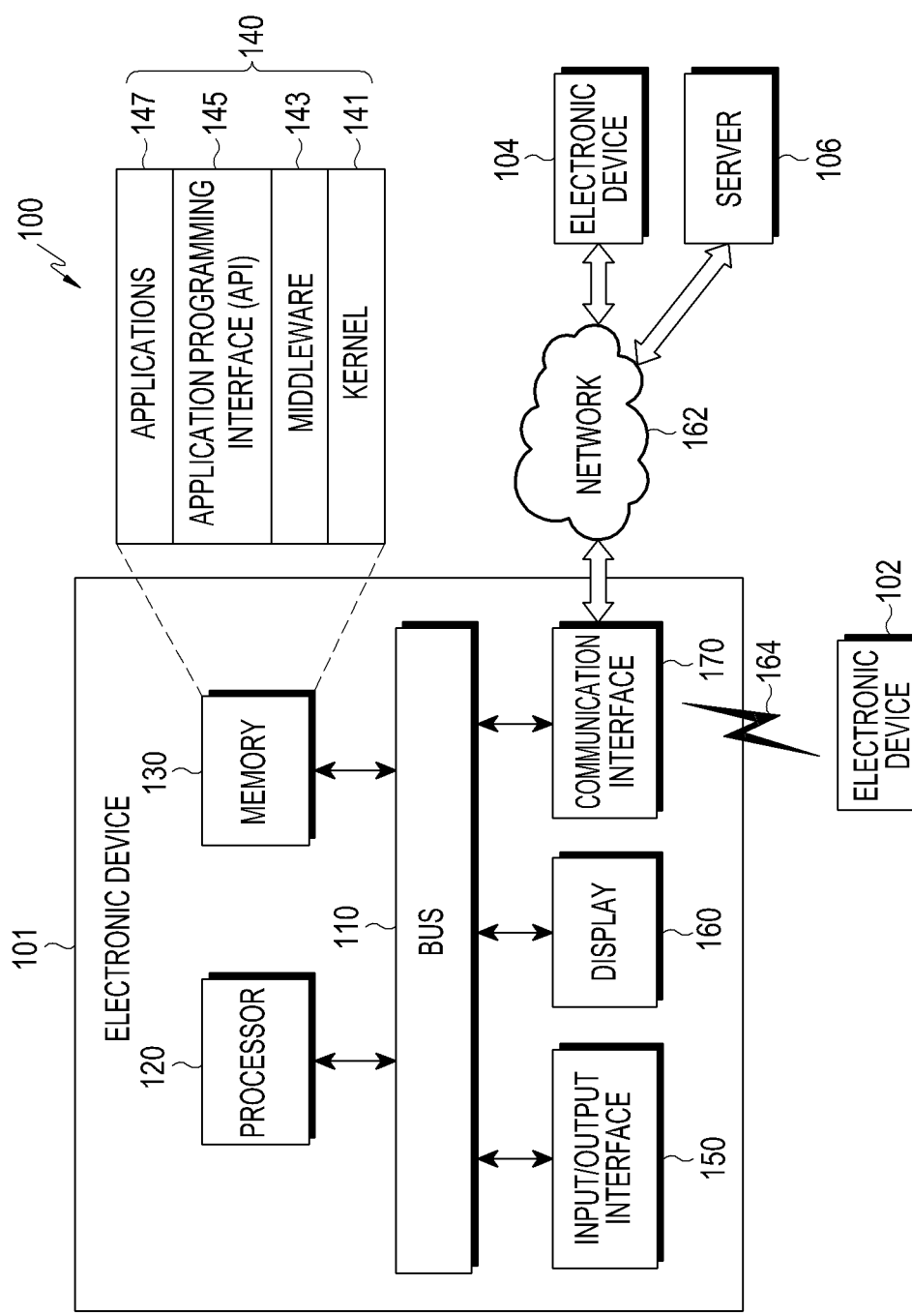
FIG. 1 is a diagram illustrating a network environment including an electronic device according to various example embodiments of the present disclosure.

Hereinafter, various example embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may refer to a situation in which the device, together with other devices or components, "is able to". For example, the phrase "processor adapted (or configured) to perform A, B, and C" may refer, for example, to a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™ Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

Referring to FIG. 1, an electronic device 101 within a network environment 100 according to various example embodiments will be described. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the elements, or may further include other elements.

The bus 110 may include, for example, a circuit that interconnects the elements 110 to 170 and transfers communication (for example, control messages or data) between the elements.

The processor 120 may include various processing circuitry, such as, for example, and without limitation, one or more of a dedicated processor, a central processing unit, an application processor, and a communication processor (CP). The processor 120 may carry out, for example, operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an Operating System (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface used by the application 147 to control a function provided from the kernel 141 or the middleware 143, and may include, for example, at least one interface or function (for example, an instruction) for file control, window control, image processing, character control, or the like. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid-Crystal Display (LCD), a Light-Emitting Diode (LED) display, an Organic Light-Emitting Diode (OLED) display, a Micro Electro Mechanical System (MEMS) display, or an electronic paper display, or the like, but is not limited thereto. The display 160 may display, for example, various types of content (e.g., text, images, videos, icons, and/or symbols) for a user. The display 160 may include a touch screen and may receive, for example, a touch, gesture, proximity, or hovering input using an electronic pen or a body part of the user.

The communication interface 170 may include various communication circuitry and configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106). Additionally, the communication interface 170 may be connected by short-range wireless communication 164 with a first electronic device 102.

The wireless communication may include, for example, cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), power line communication, and a plain old telephone service (POTS). The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in conjunction therewith. Another electronic device (for example, the electronic device 102 or 104, or the server 106) may execute the requested functions or the additional functions, and may deliver the result of execution to the electronic device 101. The electronic device 101 may provide the received result without change, or may additionally process the received result to provide the requested functions or services. To this end, for example, cloud computing, distributed computing, or client-server computing technology may be used.

According to various embodiments of the present disclosure, a camera (for example, a camera module) (not shown) may be included, and the processor 120 may control the display 160 to display an image for an external environment acquired through the camera. Further, the processor 120 may control the display 160 to display a graphic object on the image acquired through the camera. For example, the image displayed through the display 160 may be a three-dimensional image and the graphic object may also be a three-dimensional graphic object.

The processor 120 may determine a graphic object to be displayed on the image, render the determined graphic object, and display the graphic object on the image. For example, the processor 120 may combine the image and the graphic object and display them such that the graphic object is overlaid on the image. The graphic object may be a virtual graphic object generated by the processor 120 rather than an object included in the image for the external environment sensed through the camera.

According to various embodiments of the present disclosure, the processor 120 may control the display 160 to display a first image frame acquired through the camera. The first image frame may be an image frame used for determining whether to display the graphic object. For example, the first image frame may be an image frame first acquired after the camera senses the external environment or an image frame acquired before the graphic object is determined to be displayed. As described above, the first image frame may be acquired before the processor 120 determines whether to display the graphic object and may be used for determining whether to display the graphic object. The processor 120 may control the display 160 to display the first image frame regardless of the operation of determining whether to display the graphic object and thus reduce a delay generated by the operation of displaying the first image frame resulting from the time spent determining whether to display the graphic object.

According to various embodiments of the present disclosure, the processor 120 may determine at least one graphic object to be displayed on the display 160 based on a plurality of first feature points of the first image frame. The processor 120 may extract the plurality of first feature points from the first image frame.

For example, the processor 120 may extract an edge area or a corner area as the feature points based on a distribution of pixel values of the first image frame. According to various embodiments of the present disclosure, the processor 120 may extract feature points from the first image frame through a Harris corner scheme, a Scale Invariant Feature Transform (SIFT) scheme, or a Features from Accelerated Segment Test (FAST) scheme. However, this is only an example for the description, and various techniques for extracting feature points may be applied.

The processor 120 may recognize at least one object within the first image frame based on the plurality of extracted first feature points. For example, the processor 120 may recognize at least one object within the first image frame by comparing feature points for various pre-stored objects and the plurality of extracted first feature points. Further, the processor 120 may recognize at least one object within the first image frame by comparing pixel values of areas from which the plurality of first feature points are extracted and pixel values for various pre-stored objects. However, this is only an example for the description, and various techniques for recognizing objects within the image frame may be applied.

The processor 120 may determine at least one graphic object to be displayed on the display 160 based on at least one recognized object. For example, the processor 120 may identify at least one graphic object corresponding to at least one recognized object among a plurality of graphic objects stored in the memory 130 and determine at least one identified graphic object as at least one graphic object to be displayed on the display 160. A corresponding relation between the object and the graphic object may be set by the user. For example, when a particular object is recognized, the user may perform setting so as to display the particular graphic object.

Further, the processor 120 may identify at least one graphic object corresponding to at least one recognized object through an external server and determine at least one identified graphic object as at least one graphic object to be displayed on the display 160.

When at least one graphic object corresponding to at least one recognized object is identified, the processor 120 may determine to display the graphic object.

Further, when at least one graphic object corresponding to at least one recognized object is not identified, the processor 120 may determine not to display the graphic object. However, even when at least one graphic object corresponding to at least one recognized object is not identified, the processor 120 may determine to display the graphic object. In this case, the processor 120 may generate the graphic object by itself and determine the generated graphic object as at least one graphic object to be displayed on the display 160.

As described above, the processor 120 may determine whether to display the graphic object based on at least one recognized object within the first image frame and determine at least one graphic object corresponding to the at least one object as at least one graphic object to be displayed on the display 160. Further, the processor 120 may determine at least one graphic object and determine a location of at least one graphic object to be displayed in the first image frame. For example, the processor 120 may determine the location of at least one graphic object to be displayed, based on a location of at least one recognized object.

According to various embodiments of the present disclosure, based on locations of a plurality of second feature points of a second image frame acquired through the camera and the locations of the plurality of first feature points, the processor 120 may determine the location of at least one graphic object to be displayed in the second image frame. The second image frame may be an image frame acquired after the first image frame is acquired. For example, the second image frame may be the most recently acquired image frame among at least one image frame acquired through the camera after at least one graphic object is determined. For example, until the processor 120 determines at least one first graphic object to be displayed on the display based on the plurality of first feature points, the processor 120 may acquire an $n^{th}$ image frame at a time point t, and when an $n+1^{th}$ image frame is acquired at a time t+1, the second image frame may be the acquired $n+1^{th}$ image frame.

The processor 120 may extract the plurality of second feature points from the second image frame. The processor 120 may determine the location of at least one graphic object to be displayed in the second image frame by comparing locations of the plurality of first feature points and locations of the plurality of second feature points.

For example, the processor 120 may calculate (e.g., determine) a motion vector between the first image frame and the second image frame by comparing the locations of the plurality of first feature points and the locations of the plurality of second feature points. A detailed method of calculating the motion vector will be described below.

The processor 120 may determine the location of at least one graphic object to be displayed in the second image frame based on the calculated motion vector. For example, the processor 120 may determine the location of at least one graphic object to be displayed in the second image frame by moving a display location of at least one graphic object in the first frame based on the motion vector.

According to various embodiments of the present disclosure, the electronic device 101 may include a sensor (not shown) for sensing an orientation of the electronic device 101. The sensor may include an Inertia Measurement Unit (IMU) sensor (for example, a gyro sensor 240B and an acceleration sensor 240E). The electronic device 101 may sense the orientation of the electronic device 101 based on a sensing value acquired through the sensor.

The processor 120 may determine the location of at least one graphic object to be displayed in the second image frame based on the locations of the plurality of second feature points and the plurality of first feature points and the orientation of the electronic device 101 sensed through the sensor. The processor 120 may further use the orientation of the electronic device 101 sensed through the sensor in order to more accurately determine the location of at least one graphic object to be displayed in the second image frame.

Further, the processor 120 may determine a display direction of at least one graphic object based on the orientation of the electronic device 101 sensed through the sensor. In order to provide the user with a more realistic external environment image acquired through the camera, the processor 120 may display the image in three dimensions and, accordingly, when the display direction of at least one graphic object is changed due to a change in the orientation of the electronic device 101, may reflect the change and display the image on the display 160. In this case, the processor 120 may combine at least one graphic object and the second image frame according to the determined display location and the determined display direction for at least one graphic object and control the display 160 to display the combined graphic object and second image frame.

According to various embodiments of the present disclosure, the processor 120 may extract first information of at least one object from the first image frame and second information of at least one object from the second image frame. Each of the first information and the second information may be information indicating a characteristic and a location of at least one object. The first information and the second information may be extracted based on the plurality of first feature points and the plurality of second feature points.

For example, the processor 120 may extract the plurality of first feature points and recognize at least one object based on the plurality of first feature points. The processor 120 may extract characteristic information of at least one object indicating at least one recognized object according to a result of the recognition. Further, the processor 120 may identify the location of at least one object in the first image frame based on the plurality of first feature points and extract information indicating the location of at least one object according to a result of the identification. Since the information indicating the characteristic and the location of at least one object included in the second information is extracted in the same way as that described above, a separate description thereof will be omitted.

According to various embodiments of the present disclosure, the processor 120 may determine the location of at least one graphic object to be displayed in the second image frame based on the first information and the second information. A detailed method of determining the location of at least one graphic object to be displayed based on the first information and the second information will be described below.

Figure 2:
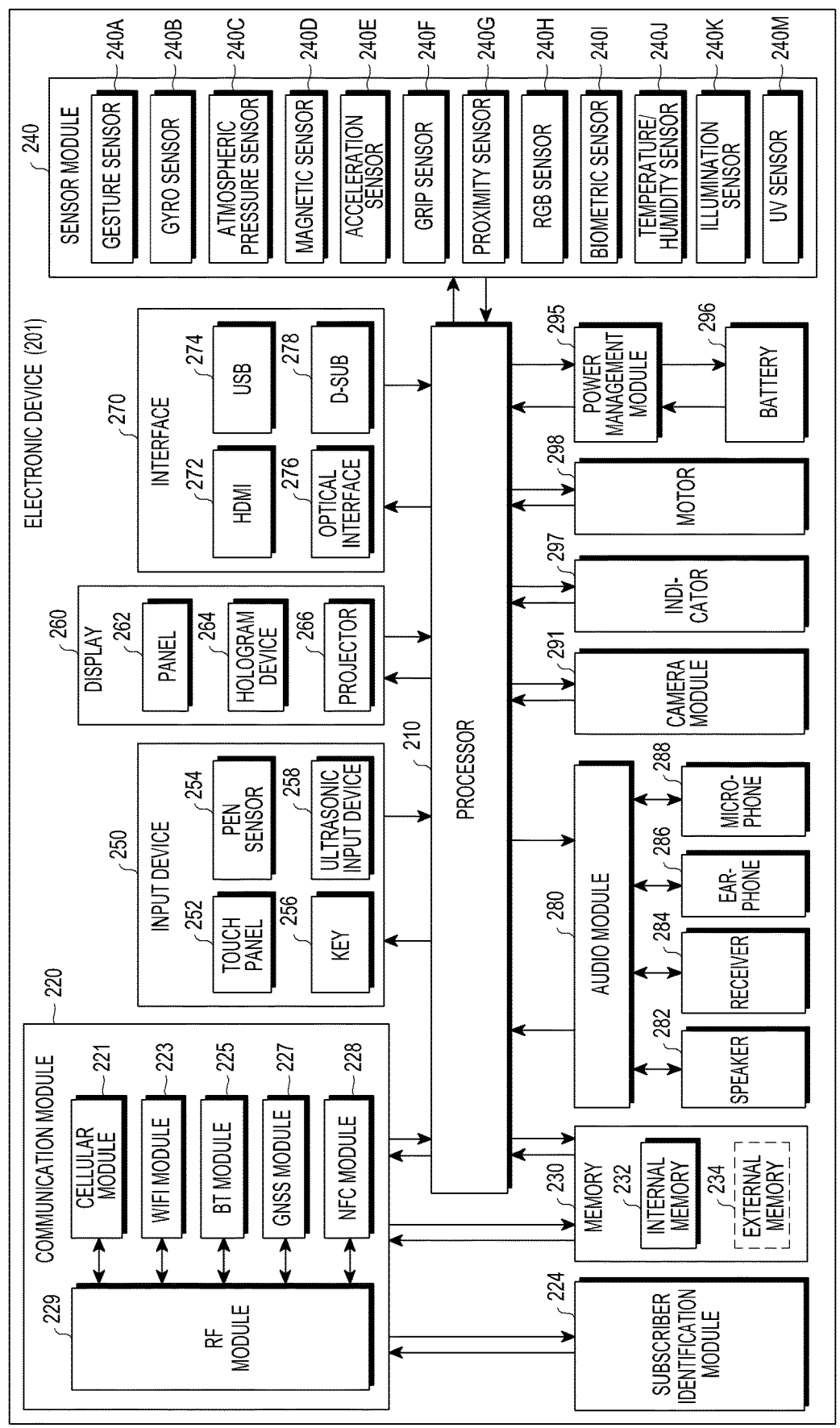
FIG. 2 is a block diagram illustrating an example electronic device according to various example embodiments of the present disclosure.

FIG. 2 is a block diagram illustrating an example electronic device 201 according to various embodiments. The electronic device 201 may include, for example, the whole or part of the electronic device 101 illustrated in FIG. 1.

The electronic device 201 may include at least one processor (e.g., including processing circuitry) 210 (for example, an AP), a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software elements connected thereto and may perform various data processing and operations by driving an operating system or an application program. The processor 210 may be implemented, for example, as a System on Chip (SoC). According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the result data in the non-volatile memory.

The communication module 220 may have a configuration that is the same as, or similar to, that of the communication interface 170. The communication module 220 may include various communication circuitry, such as, for example, and without limitation, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). According to some embodiments, at least some (for example, two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (for example, an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module, or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 and/or an external memory 234. The internal memory 232 may include, for example, at least one of a volatile memory (for example, a DRAM, an SRAM, an SDRAM, or the like) and a non-volatile memory (for example, a one-time programmable ROM (OTPROM), a PROM, an EPROM, an EEPROM, a mask ROM, a flash ROM, a flash memory, a hard disc drive, or a solid-state drive (SSD)). The external memory 234 may include a flash drive, for example, a compact flash (CF), a secure digital (SD), a Micro-SD, a Mini-SD, an eXtreme digital (xD), a multimedia card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a red, green, blue (RGB) sensor), a biometric sensor 240I, a temperature/humidity sensor 240J, a light (e.g., illumination) sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the AP 210, and may control the sensor module 240 while the AP 210 is in a sleep state.

The input device 250 may include various input circuitry, such as, for example, and without limitation, a touch panel 252, a (digital) pen sensor 254, a key 256, or an ultrasonic input device 258. The touch panel 252 may be, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor), which may measure the strength of pressure of a user's touch. The pressure sensor may be implemented so as to be integrated with the touch panel 252 or implemented by one or more sensors separate from the touch panel 252. The hologram device 264 may show a three-dimensional image in the air using the interference of light. The projector 266 may display an image by projecting light onto a screen. The screen may be located, for example, in the interior of, or on the exterior of, the electronic device 201.

The interface 270 may include various interface circuitry, such as, for example, and without limitation, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may, for example, include a mobile high-definition link (MHL) interface, a secure digital (SD) card/multimedia card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, or the like. The electronic device 201 may include a mobile TV support device (for example, a GPU) that can process media data according to a standard such as digital multimedia broadcasting (DMB), digital video broadcasting (DVB), mediaFlo™ or the like. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
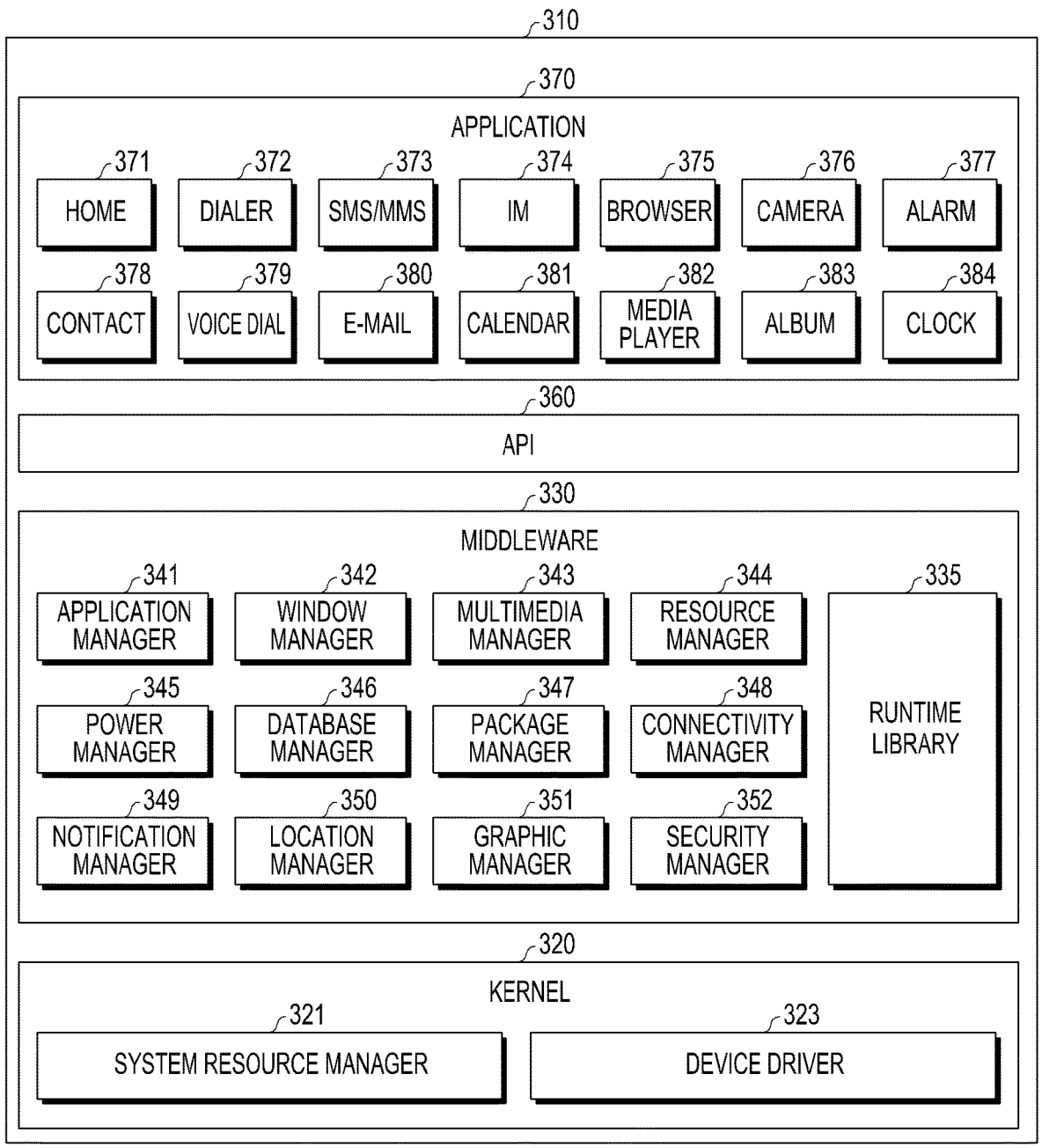
FIG. 3 is a block diagram illustrating an example program module according to various example embodiments of the present disclosure.

FIG. 3 is a block diagram illustrating an example program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™.

Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use the limited system resources within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process arithmetic functions. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements.

The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 may include, for example, one or more applications that can perform functions such as home 371, a dialer 372, SMS/MMS 373, instant messaging (IM) 374, a browser 375, a camera 376, an alarm 377, contacts 378, voice dialing 379, e-mail 380, a calendar 381, a media player 382, an album 383, a clock 384. Additionally, or alternatively, and although not illustrated, the applications may include, health-care applications (for example, for measuring exercise quantity or blood glucose), environment information (for example, atmospheric pressure, humidity, or temperature information) provision applications, and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (for example, turning on/off the external electronic device itself (or some elements thereof) or adjusting the brightness (or resolution)

of a display) or applications executed in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions.

Figure 4:
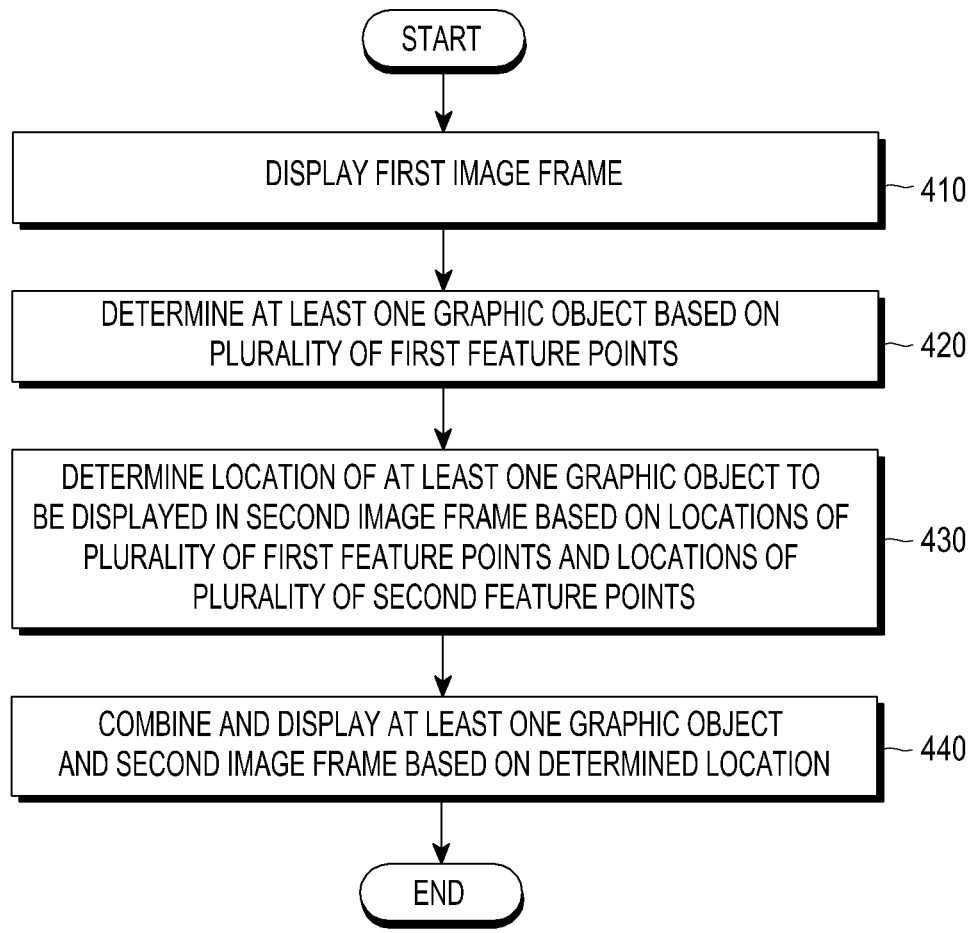
FIG. 4 is a flowchart illustrating an example method of displaying a graphic object by an electronic device according to various example embodiments of the present disclosure.

FIG. 4 is a flowchart illustrating an example method of displaying a graphic object by an electronic device according to various example embodiments of the present disclosure.

In operation 410, the electronic device 101 may display a first image frame acquired through a camera on a display of the electronic device 101. The first image frame may be an image frame used for determining whether to display the graphic object.

Figure 5:
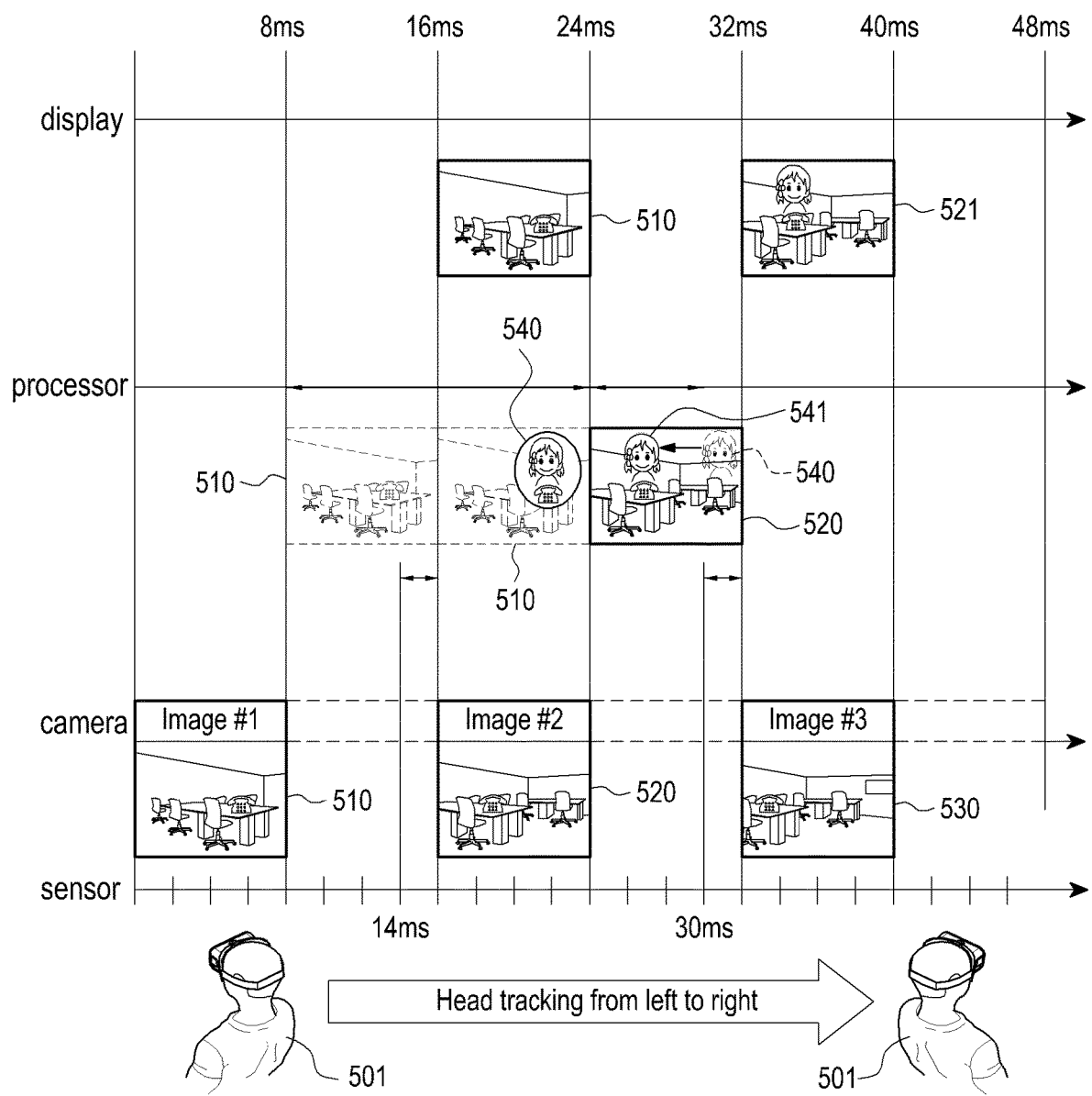
FIG. 5 is a diagram illustrating an example method of displaying a graphic object by an electronic device according to various example embodiments of the present disclosure.

FIG. 5 is a diagram illustrating an example graphic object display process of the electronic device 101 when the electronic device is an HMID and a head of a user 501 wearing the HMID moves from the left to the right. Referring to FIG. 5, the electronic device 101 may acquire a first image frame 510 through a camera of the electronic device 101. According to an embodiment, in order to reduce the generation of a mismatch between motion information and visual information, a camera employing a global shutter may be used. Accordingly, as illustrated in FIG. 5, the camera employing the global shutter may sense the entire external environment at once.

After acquiring the first image frame 510, the electronic device 101 may immediately display the first image frame 510 through the display 160 regardless of an analysis operation of extracting feature points in the first image frame 510. Accordingly, the electronic device 101 may reduce a delay generated in the operation of displaying the first image frame 510 according to a time used for performing the analysis operation. Further, the electronic device 101 may sequentially display image frames on the display 160 according to a preset time period in order to reduce the generation of the mismatch between motion information and visual information. For example, referring to FIG. 5, the electronic device 101 may sequentially display image frames every 16 ms. Accordingly, the generation of the mismatch between the motion information and the visual information may be reduced.

Referring back to FIG. 4, in operation 420, the electronic device 101 may determine at least one graphic object to be displayed on the display 160 based on a plurality of first feature points of the first image frame 510.

The electronic device 101 may extract the plurality of first feature points from the first image frame 510 and recognize at least one object within the first image frame 510 based on the plurality of first feature points. For example, referring to FIG. 5, the electronic device 101 may recognize desks and chairs corresponding to objects included in the first image frame 510 through the plurality of extracted first feature points.

The electronic device 101 may determine at least one graphic object based on at least one recognized object within the first image frame 510. For example, referring to FIG. 5, the electronic device 101 may recognize a telephone corresponding to one of the objects within the first image frame 510 based on the plurality of first feature points of the first image frame 510. The electronic device 101 may determine a graphic object 540 corresponding to the telephone among the plurality of stored graphic objects as a graphic object to be displayed on the display 160.

In operation 430, based on locations of the plurality of first feature points and locations of a plurality of second feature points of a second image frame, the electronic device 101 may determine a location at which at least one graphic object determined in the second image frame will be displayed. For example, referring to FIG. 5, the second image frame 520 may be the most recently acquired image frame among at least one image frame acquired through the camera after the graphic object 540 is determined in operation 420. Accordingly, the second image frame 520 may be used for combining with the graphic object 540.

Although not illustrated in FIG. 5, if operation 420 ends after a third image frame 530 is acquired, the most recently acquired image frame, among at least one image frame acquired through the camera after the graphic object 540 is determined, may be the third image frame 530. Accordingly, the electronic device 101 may determine the location at which the graphic object 540 determined in operation 420 will be displayed in the third image frame 530 based on locations of the plurality of first feature points and locations of third feature points of the third image frame 530.

In operation 440, the electronic device 101 may combine at least one graphic object and the second image frame based on the location at which at least one determined graphic object will be displayed, and may display the combined graphic object and the second image frame on the display 160. For example, referring to FIG. 5, the electronic device 101 may move the display location of the graphic object to the location determined in operation 430 in the first image frame and display an image frame 521 generated by combining the graphic object 540, of which the location has moved 541, and the second image frame 520 on the display 160.

Further, the electronic device 101 may sense the orientation of the electronic device 101 through a sensor included in the electronic device 101. For example, as illustrated in FIG. 5, the electronic device 101 may acquire a sensing value through the sensor every 2 ms and sense the orientation of the electronic device 101 based on the acquired sensing value.

The electronic device 101 may convert a coordinate of the image frame in accordance with the orientation of the electronic device 101 based on the sensing value acquired, through the sensor, most recently from the time point at which the image frame is displayed. For example, as described above, the electronic device 101 may directly display the first image frame 510 on the display 160 without a separate coordinate conversion, but, in order to more accurately display the first image frame 510 according to the orientation of the electronic device 101, may convert a display direction of the first image frame 510 in accordance with the orientation of the electronic device 101 based on the sensing value acquired through the sensor at 14 ms and display the converted first image frame 510 on the display 160. For example, the electronic device 101 may convert a coordinate of the first image frame 510 in accordance with the orientation of the electronic device 101 based on the sensing value acquired at 14 ms and display the converted first image frame 510 on the display 160.

Further, in order to more accurately determine the location at which the graphic object 540 will be displayed in the second image frame 520, the electronic device 101 may further use the orientation of the electronic device 101 sensed through the sensor.

In addition, in an operation of displaying the image generated by combining the second image frame 520 and the graphic object 540, the electronic device 101 may convert the coordinate of the image in accordance with the orientation of the electronic device 101 based on the sensing value acquired through the sensor at 30 ms and display the converted image on the display 160.

FIGS. 6A, 6B and 6C are diagrams illustrating example extraction of feature points from an image frame by the electronic device according to various example embodiments of the present disclosure.

According to various embodiments of the present disclosure, the electronic device 101 may extract feature points from an image frame acquired through the camera. The electronic device 101 may move, little by little, a window of a preset size and extract a point having a large image change as the feature point.

For example, as illustrated in FIGS. 6A to 6C, the electronic device 101 may move a window of a preset size. When a window 601 is located as illustrated in FIG. 6A, image changes in all directions from the window 601 may be equal to or smaller than a preset threshold value. In this case, the electronic device 101 may determine that a flat area exists and may not extract the feature point from the flat area.

Further, as illustrated in FIG. 6B, when a window 602 is located over an edge, an image change based on the window 602 may be larger than or equal to a preset threshold value. The electronic device 101 may recognize that the window 602 is located at an edge part in consideration of the direction in which the image change is generated and may extract the feature point at the location of the window 602.

As illustrated in FIG. 6C, when a window 603 is located over a corner, an image change based on the window 603 may be larger than or equal to a preset threshold value. The electronic device 101 may recognize that the window 603 is located at a corner part in consideration of the direction in which the image change is generated and may extract the feature point at the location of the window 603.

As described above, the electronic device 101 may extract the feature point based on the area where the image change is generated. Further, the above-described feature point extraction method is only an example for description, and various methods of extracting the feature points from the image may be applied.

FIG. 7 is a diagram illustrating an example method of recognizing an object by the electronic device according to various example embodiments of the present disclosure.

According to various embodiments of the present disclosure, the electronic device 101 may recognize at least one object within an image frame based on feature points extracted from the image frame.

The electronic device 101 may compare a plurality of feature points extracted from the image frame with feature points of a plurality of objects stored in the electronic device 101. For example, as illustrated in FIG. 7, it is assumed that the electronic device 101 extracts feature points from a telephone 701, corresponding to an object within the image frame. In this case, the electronic device 101 may compare the feature points extracted from the image frame with feature points of a telephone 710, a notebook computer 720, a TV 730, a smart phone 740, and a chair 750, corresponding to the plurality of objects stored in the electronic device 101.

The electronic device 101 may select an object that matches the feature points extracted from the image frame from the plurality of objects stored in the electronic device 101 based on the result of the comparison. The electronic device 101 may recognize the object within the image frame as the selected object.

For example, as illustrated in FIG. 7, the electronic device 101 may determine that the extracted feature points match the feature points of the telephone 710 among the plurality of objects stored in the electronic device 101. Accordingly, the electronic device 101 may recognize that the object 701 associated with the feature points extracted from the image frame is the telephone.

As described above, the electronic device 101 may recognize the object within the image frame based on the extracted feature points. Further, the above-described object recognition method is only an example for description, and various methods of recognizing the object in the image may be applied.

Figure 8:
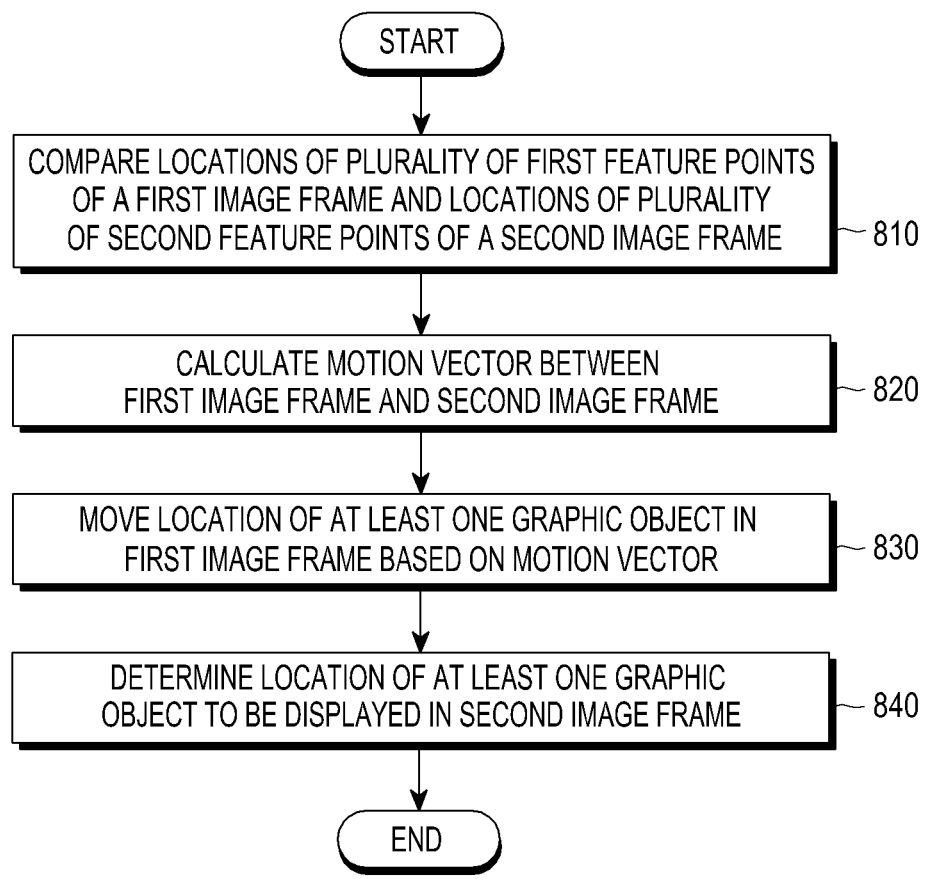
FIG. 8 is a flowchart illustrating an example method of determining a display location of a graphic object by an electronic device according to various example embodiments of the present disclosure.

FIG. 8 is a flowchart illustrating an example method of determining the display location of a graphic object by the electronic device according to various example embodiments of the present disclosure.

In operation 810, the electronic device 101 may compare locations of a plurality of first feature points of a first image frame and locations of a plurality of second feature points of a second image frame, respectively.

Figure 9:
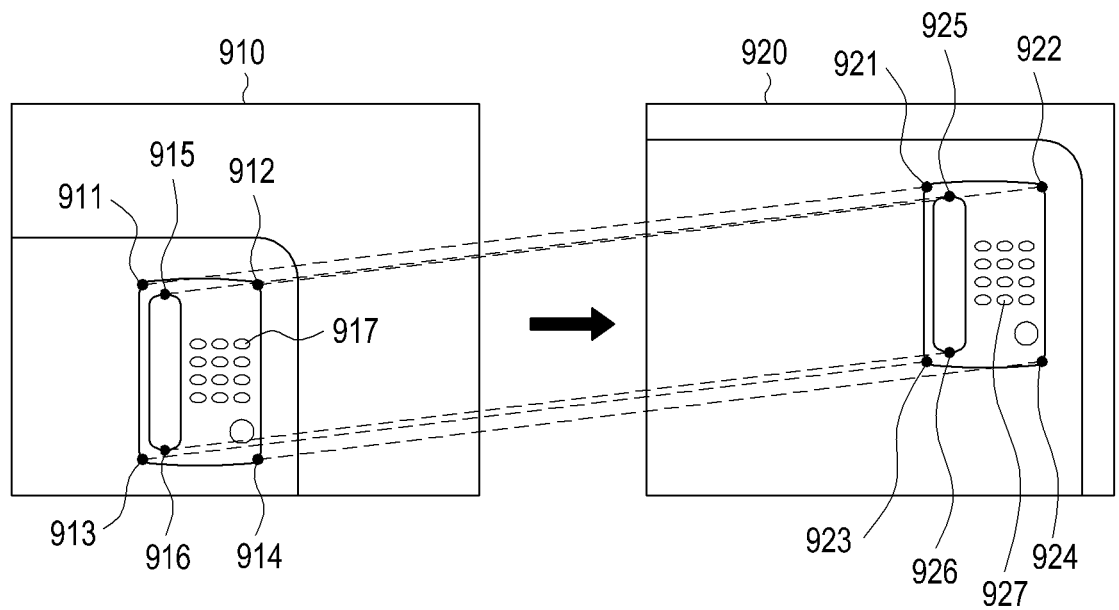
FIG. 9 is a diagram illustrating an example method of comparing locations of a plurality of feature points between image frames by an electronic device according to various example embodiments of the present disclosure.

Referring to FIG. 9, the electronic device 101 may compare locations of a plurality of first feature points 911, 912, 913, 914, 915, 916, and 917 of a first image frame 910 and locations of a plurality of second feature points 921, 922, 923, 924, 925, 926, and 927 of a second image frame 920, respectively.

For example, the electronic device 101 may determine corresponding relations between the plurality of first feature points 911, 912, 913, 914, 915, 916, and 917 of the first image frame 910 and the plurality of second feature points 921, 922, 923, 924, 925, 926, and 927 of the second image frame 920, respectively. Among the plurality of first feature points 911, 912, 913, 914, 915, 916, and 917 and the plurality of second feature points 921, 922, 923, 924, 925, 926, and 927, the electronic device 101 may compare the locations of the feature points that correspond to each other according to the result of the determination.

For example, as illustrated in FIG. 7, the electronic device 101 may compare the locations of the first feature point 911 and the second feature point 921, the first feature point 912 and the second feature point 922, the first feature point 913 and the second feature point 923, the first feature point 914 and the second feature point 924, the first feature point 915 and the second feature point 925, the first feature point 916 and the second feature point 926, and the first feature point 917 and the second feature point 927, which correspond to each other.

In operation 820, the electronic device 101 may calculate (e.g., determine) a motion vector between the first image frame and the second image frame based on a result of the location comparison in operation 810.

Figure 10:
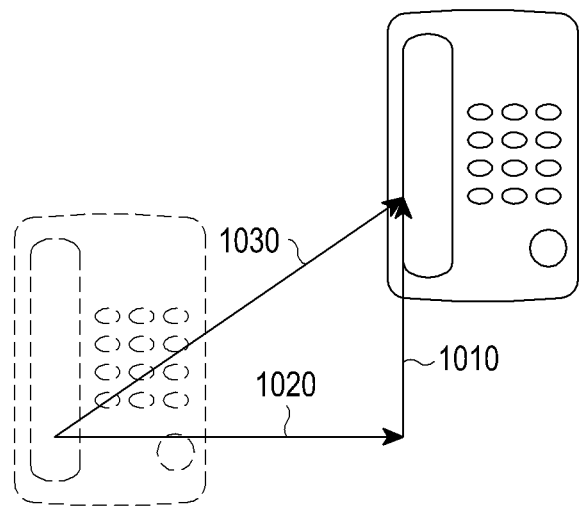
FIG. 10 is a diagram illustrating an example method of calculating a motion vector by an electronic device according to various example embodiments of the present disclosure.

Referring to FIG. 10, the electronic device 101 may calculate an x-direction vector 1020 and a y-direction vector 1010 indicating a location change of a telephone corresponding to an object within the first image frame and the second image frame according to the result of the location comparison in operation 810. The electronic device 101 may calculate a motion vector 1030 based on the calculated x-direction vector 1020 and y-direction vector 1010.

The electronic device 101 may determine the motion vector 1030 as the motion vector between the first image frame and the second image frame. Further, the electronic device 101 may calculate a motion vector for each of a plurality of objects within the first image frame and the second image frame, and may determine the calculated motion vector for each of the plurality of objects as the motion vector between the first image frame and the second image frame. The motion vector calculating method described in FIG. 10 is only an example, and various methods of calculating the motion vector between image frames may be applied.

In operation 830, the electronic device 101 may move the location of at least one graphic object in the first image frame based on the motion vector calculated in operation 820.

The electronic device 101 may identify the location of the graphic object in the first image frame. The location of the graphic object in the first image frame may be set by a user. For example, the graphic object in the first image frame may be set based on the location of an object within the first image frame corresponding to the graphic object.

The electronic device 101 may move the identified location of the graphic object within the first image frame based on the motion vector calculated in operation 820. For example, the electronic device 101 may convert coordinates indicating the location of the graphic object within the first image frame according to the motion vector.

In operation 840, the electronic device 101 may determine the location of at least one graphic object moved in operation 830 as a location at which at least one graphic object will be displayed in the second image frame. Further, the electronic device 101 may further adjust the location of at least one graphic object moved in operation 830 in consideration of the orientation of the electronic device, sensed through the sensor, and determine the adjusted location to be the location at which at least one graphic object will be displayed in the second image frame.

The electronic device 101 may combine at least one graphic object and the second image frame according to the determined location and display the combined graphic object and second image frame on the display 160. Further, the electronic device 101 may determine the display direction of the graphic object according to the orientation of the electronic device sensed through the sensor, combine at least one graphic object and the second image frame according to the determined location and the determined display direction, and display the combined graphic object and second image frame on the display 160.

Figure 11A:
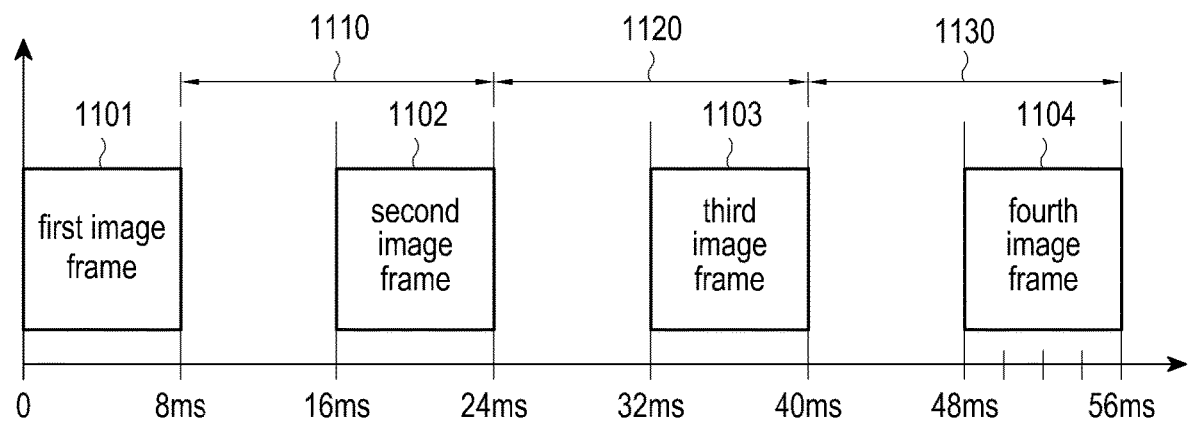
FIGS. 11A and 11B are diagrams illustrating a time point at which an electronic device analyzes an image frame according to various example embodiments of the present disclosure.
Figure 11B:
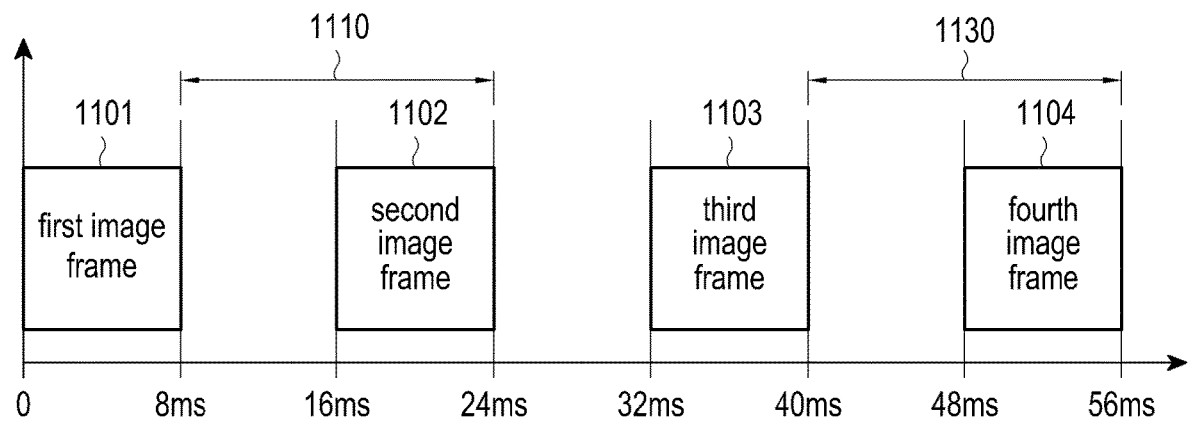

FIGS. 11A and 11B are diagrams illustrating the time point at which the electronic device analyzes an image frame according to various example embodiments of the present disclosure.

According to various embodiments of the present disclosure, the electronic device 101 may determine a graphic object to be displayed on the display 160 based on an acquired image frame and adjust a location of the determined graphic object to correspond to an image frame acquired after the image frame. Further, the electronic device 101 may combine and display the graphic object and the image frame acquired after the image frame according to the adjusted location.

As described above, a series of operations for displaying the graphic object performed by the electronic device 101 may be performed for every image frame acquired through the camera, as illustrated in FIG. 11A. For example, the electronic device 101 may perform a series of operations for displaying the graphic object based on a first image frame 1101 for 1110 ms, combine the graphic object, of which the location has been adjusted according to a result of the performance, and a second image frame 1102, and display the combined graphic object and second image frame 1102.

Similarly, the electronic device 101 may perform a series of operations for displaying the graphic object based on the second image frame 1102 for 1120 ms, combine the graphic object, of which the location has been adjusted according to a result of the performance, and a third image frame 1103, and display the combined graphic object and third image frame 1103. Further, the electronic device 101 may perform a series of operations for displaying the graphic object based on the third image frame 1103 for 1130 ms, combine the graphic object, of which the location has been adjusted according to a result of the performance, and a fourth image frame 1104, and display the combined graphic object and the fourth image frame 1104.

Meanwhile, the electronic device 101 may not perform a series of operations for displaying the graphic object in every image frame acquired through the camera in order to reduce the amount of performed calculations. The electronic device 101 may perform a series of operations for displaying the graphic object once a preset number of image frames.

For example, as illustrated in FIG. 11B, the electronic device 101 may perform a series of operations for displaying the graphic object once every two image frames. The electronic device 101 may perform a series of operations for displaying the graphic object based on the first image frame 1101 for 1110 ms and may combine and display the graphic object, of which the location is adjusted according to a result of the performance, and the second image frame 1102.

Further, the electronic device 101 may perform a series of operations for displaying the graphic object based on the third image frame 1103 for 1130 ms without performing a series of operations for displaying the graphic object based on the second image frame 1102, and may combine and display the graphic object, of which the location is adjusted according to a result of the performance, and the fourth image frame 1104.

As described above, the electronic device 101 may adjust the frequency at which a series of operations for displaying the graphic object is performed in order to reduce the amount of calculations.

Figure 12:
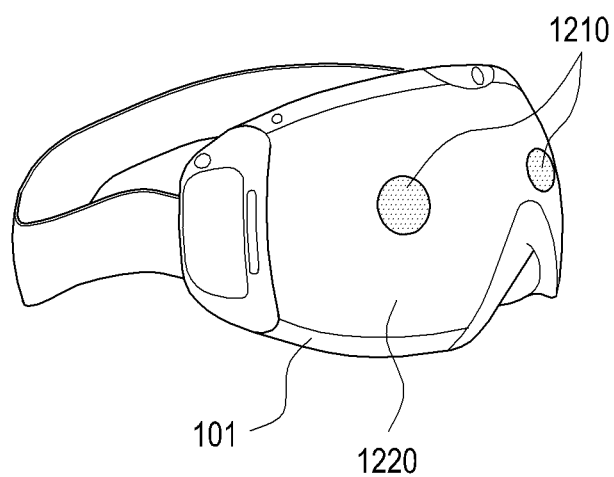
FIG. 12 is a diagram illustrating an example HMD according to various example embodiments of the present disclosure.

FIG. 12 is a diagram illustrating an example HMD according to various example embodiments of the present disclosure.

According to various embodiments of the present disclosure, the electronic device 101 may be implemented as an HMD illustrated in FIG. 12 to provide a virtual-reality service to a user. The electronic device 101 may include cameras 1210 and 1220 for photographing an external environment as illustrated in FIG. 12. The number of cameras may be plural, as illustrated in FIG. 12, or may be singular.

The electronic device 101 may include a display for displaying an image acquired through the cameras 1210 and 1220 and displaying a graphic object on the image. Accordingly, even though the electronic device 101 is a see-closed type, the user may see the external environment through the electronic device 101 in real time.

Further, the electronic device 101 according to various embodiments of the present disclosure may reduce a motion-to-photon latency through the above-described object display method, thereby providing more comfortable viewing conditions to the user.

Figure 13:
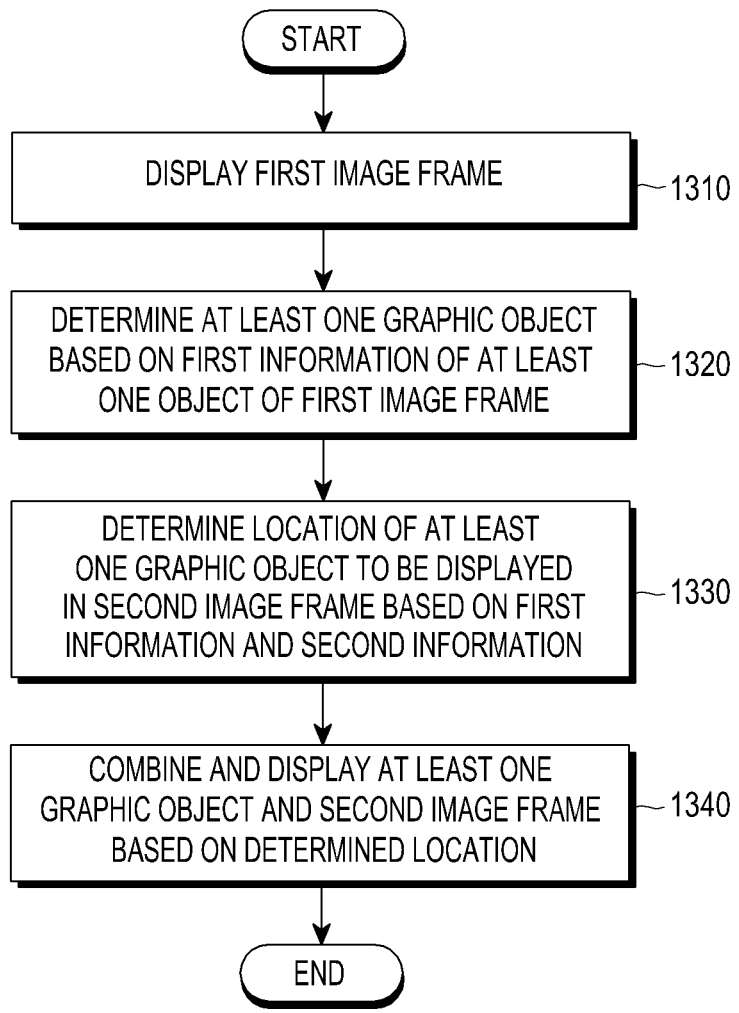
FIG. 13 is a flowchart illustrating an example method of displaying a graphic object by an electronic device according to various example embodiments of the present disclosure.

FIG. 13 is a flowchart illustrating an example method of displaying a graphic object by the electronic device according to various example embodiments of the present disclosure.

In operation 1310, the electronic device 101 may display the first image frame acquired through the camera on the display of the electronic device 101. The first image frame may be an image frame used for determining whether to display the graphic object.

In operation 1320, the electronic device 101 may determine at least one graphic object to be displayed on the display 160 based on first information of at least one object of the first image frame.

The electronic device 101 may extract the plurality of first feature points from the first image frame and recognize at least one object based on the plurality of first feature points. The electronic device 101 may extract characteristic information of at least one object indicating at least one recognized object according to a result of the recognition.

Further, the electronic device 101 may identify the location of at least one object in the first image frame based on the plurality of first feature points and extract information indicating the location of at least one object according to a result of the identification.

The electronic device 101 may determine at least one graphic object corresponding to at least one object according to the characteristic information of at least one object.

In operation 1330, the electronic device 101 may determine the location of at least one object to be displayed in a second image frame based on first information and second information of at least one object of the second image frame.

The electronic device 101 may determine the location of at least one graphic object to be displayed in the second image frame based on information indicating at least one object included in each of the first information and the second information. The detailed method of determining the location of at least one graphic object to be displayed in the second image frame will be described in greater detail below with reference to FIG. 14.

In operation 1340, the electronic device 101 may combine at least one graphic object and the second image frame based on the determined location and display the combined graphic object and second image frame on the display 160.

Figure 14:
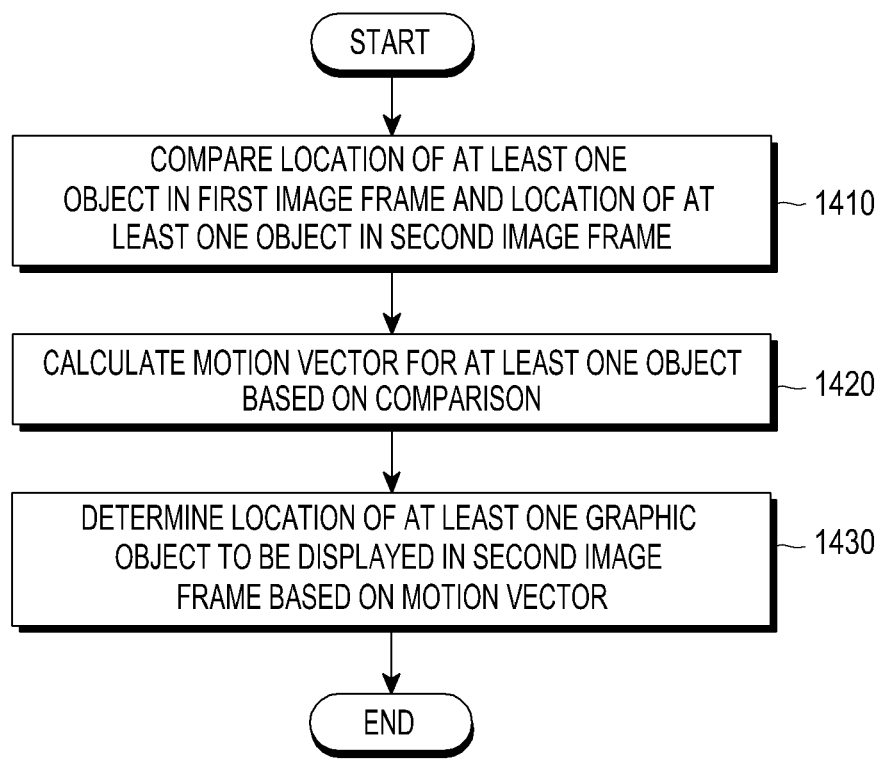
FIG. 14 is a flowchart illustrating an example method of determining a display location of a graphic object by an electronic device according to various example embodiments of the present disclosure.

FIG. 14 is a flowchart illustrating an example method of determining the location of a graphic object by the electronic device according to various example embodiments of the present disclosure.

In operation 1410, the electronic device 101 may compare the location of at least one object in the first image frame and the location of at least one object in the second image frame based on information indicating the location of at least one object included in each of the first information and the second information.

In operation 1420, the electronic device 101 may calculate a motion vector for at least one object according to a result of the comparison. Since an example of a detailed method of calculating the motion vector is the same as or similar to the description of FIG. 10, a separate description will be omitted.

In operation 1430, the electronic device 101 may determine the location of at least one graphic object to be displayed in the second image frame based on the motion vector calculated in operation 1420. For example, the electronic device 101 may convert coordinates indicating the location of at least one graphic object in the first image frame according to the motion vector and determine the converted coordinates as the location of at least one graphic object to be displayed in the second image frame.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may include a unit including one or more combinations of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicated processor, a CPU, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The instruction may include a code made by a complier or a code that can be executed by an interpreter. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments of the present disclosure, a non-transitory computer-readable recording medium having a program recorded therein to be executed on a computer is provided. The program may include executable instructions to cause, when executed by a processor, the processor to perform an operation of displaying an acquired first image frame, an operation of determining at least one graphic object to be displayed, based on a plurality of first feature points of the first image frame, an operation of determining a location of the at least one graphic object to be displayed in a second image frame based on locations of a plurality of second feature points of the acquired second image frame and locations of the plurality of first feature points, an operation of combining the at least one graphic object and the second image frame according to the determined location and an operation of displaying the combined at least one graphic object with the second image frame.

Various example embodiments disclosed and described herein are provided merely to easily describe technical details of the present disclosure and to aid in the understanding of the present disclosure, and are not intended to limit the scope of the present disclosure. Accordingly, the scope of the present disclosure should be understood as including all modifications or various other embodiments based on the technical idea of the present disclosure.

What is claimed is:

1. An electronic device comprising:
a camera;
a memory;
a display; and
a processor configured to:
control the display to display a first image frame acquired through the camera,
recognize at least one object within the first image frame based on a plurality of first feature points of the first image frame,
identify, from among a plurality of graphic objects stored in the memory, at least one different graphic object, having a shape not present in the first image, to be displayed corresponding to the at least one recognized object in the first image frame, the plurality of graphic objects having shapes different from each other;
identify a display location of the at least one different graphic object to be displayed in a second image frame following the first image frame, acquired through the camera according to a movement of the electronic device, based on a moving distance and a moving direction between locations of a plurality of second feature points of the second image frame and locations of the plurality of first feature points,
combine the at least one different graphic object and the second image frame based on the display location, and
control the display to display the combined at least one different graphic object and second image frame.

2. The electronic device of claim 1, wherein the processor is configured to:
extract the plurality of first feature points from the first image frame, and
extract the plurality of second feature points from the second image frame.

3. The electronic device of claim 2, wherein when extracting the plurality of first feature points or the plurality of second feature points, the processor is configured to:
move a window of a preset size, and
extract feature points from the window based on areas where change is larger than a preset value.

4. The electronic device of claim 1, wherein the processor is configured to:
identify the display location of the at least one different graphic object to be displayed in the second image frame by comparing the locations of the plurality of first feature points and the locations of the plurality of second feature points.

5. The electronic device of claim 1, wherein the processor is configured to:
compare the locations of the plurality of first feature points and the locations of the plurality of second feature points,
obtain a motion vector between the first image frame and the second image frame based on as a result of the comparison, and
identify the display location of the at least one different graphic object to be displayed in the second image frame based on the motion vector.

6. The electronic device of claim 5, wherein the processor is configured to:
identify a first location of the at least one different graphic object in the first image frame based on a location of the at least one recognized object, and
identify the display location of the at least one different graphic object to be displayed in the second image frame by moving the first location of the at least one different graphic object in the first image frame based on the motion vector.

7. The electronic device of claim 1, further comprising:
a sensor,
wherein the processor is configured to identify the display location of the at least one different graphic object to be displayed in the second image frame based on the locations of the plurality of second feature points, the locations of the plurality of first feature points and an orientation of the electronic device sensed through the sensor.

8. The electronic device of claim 7, wherein the processor is configured to:
identify a display direction of the at least one different graphic object based on the orientation of the electronic device sensed through the sensor,
combine the at least one different graphic object and the second image frame based on the display location and the display direction, and
control the display to display the combined at least one different graphic object and second image frame.

9. The electronic device of claim 7, wherein the processor is configured to:
change a display direction of the first image frame to correspond to the orientation of the electronic device sensed through the sensor and
control the display to display the first image frame having the changed display direction.

10. The electronic device of claim 1, wherein the second image frame corresponds to a most recent image frame from among at least one image frame acquired through the camera after the at least one different graphic object corresponding to the at least one recognized objection is identified.

11. The electronic device of claim 1, wherein the processor is configured to identify the display location of the at least one graphic object to be separated from a display location of the at least one recognized object.

12. The electronic device of claim 1, wherein the processor is configured to identify the display location of the at least one graphic object for each preset number of image frames.

13. A non-transitory computer-readable recording medium having a program recorded thereon which, when executed by a processor, causes the processor to perform operations, the operations comprising:
displaying an acquired first image frame;
recognizing at least one object within the first image frame based on a plurality of first feature points of the first image frame;
identifying, from among a plurality of graphic objects stored in the memory, at least one different graphic object, having a shape not present in the first image, to be displayed corresponding to the at least one recognized object in the first image frame, the plurality of graphic objects having shapes different from each other;

identifying a display location of the at least one different graphic object to be displayed in an acquired second image frame following the first image frame according to a movement of an electronic device, based on a moving distance and a moving direction between locations of a plurality of second feature points of the second image frame and locations of the plurality of first feature points;

combining the at least one graphic object and the second image frame based on the display location; and displaying the combined at least one different graphic object and second image frame.

14. The non-transitory computer-readable recording medium of claim 13, wherein the executable instructions further cause operation of:

extracting the plurality of first feature points from the first image frame;

extracting the plurality of second feature points from the second image frame.

15. The non-transitory computer-readable recording medium of claim 13, wherein the identifying of the display location of the at least one different graphic object to be displayed in the second image frame comprises:

identifying the display location of the at least one different graphic object to be displayed in the second image frame by comparing the locations of the plurality of first feature points and the locations of the plurality of second feature points.

16. The non-transitory computer-readable recording medium of claim 13, wherein the identifying of the display location of the at least one different graphic object to be displayed in the second image frame comprises:

comparing the locations of the plurality of first feature points and the locations of the plurality of second feature points;

obtaining a motion vector between the first image frame and the second image frame based on a result of the comparison; and identifying the display location of the at least one different graphic object to be displayed in the second frame based on the motion vector.

17. The non-transitory computer-readable recording medium of claim 16, wherein the identifying of the display location of the at least one different graphic object to be displayed in the second image frame further comprises:

identifying a first location of the at least one different graphic object in the first image frame based on a location of the at least one recognized object, and identifying the display location of the at least one different graphic object to be displayed in the second image frame by moving the first location of the at least one different graphic object in the first image frame based on the motion vector.

18. The non-transitory computer-readable recording medium of claim 13, wherein the identifying of the display location of the at least one different graphic object to be displayed in the second image frame comprises:

identifying the display location of the at least one different graphic object to be displayed in the second image frame based on the locations of the plurality of second feature points, the locations of the plurality of first feature points and an orientation of an electronic device sensed through a sensor.

19. The non-transitory computer-readable recording medium of claim 18, wherein the executable instructions further comprise the operations of:

identifying a display direction of the at least one different graphic object based on the sensed orientation of the electronic device;

combining the at least one different graphic object and the second image frame based on the display location and the display direction; and displaying the combined at least one different graphic object and second image frame.

20. The non-transitory computer-readable recording medium of claim 13, wherein the second image frame is a most recent image frame from among at least one acquired image frame after the at least one different graphic object corresponding to the at least one recognized object is identified.

* * * * *